(No Model.)  2 Sheets—Sheet 1.
W. H. HAWORTH.
Corn-Planter.
No. 228,068. Patented May 25, 1880.
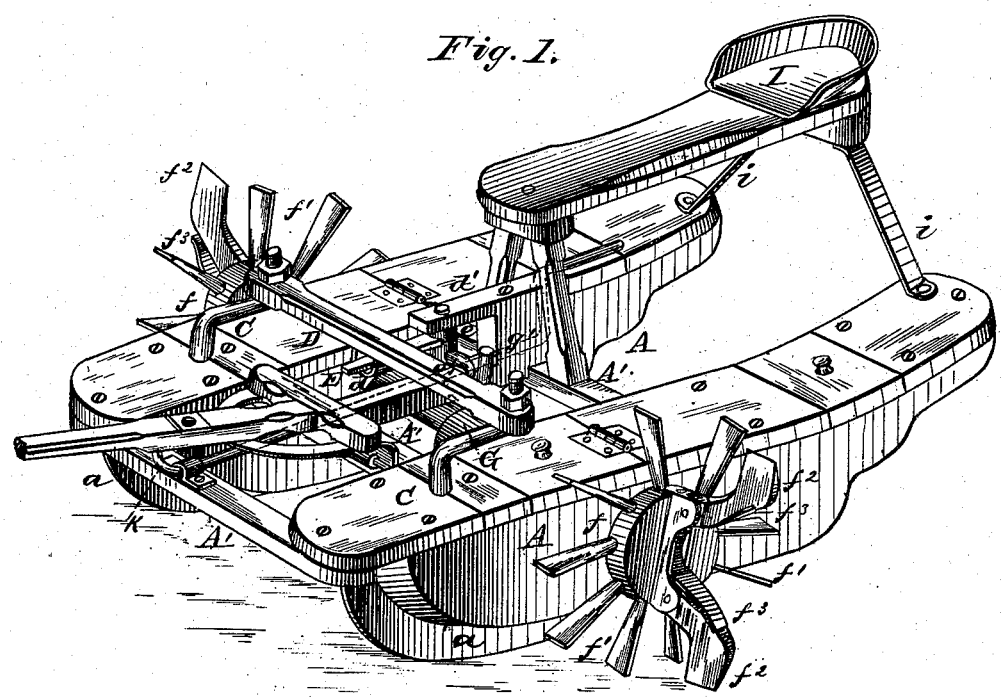
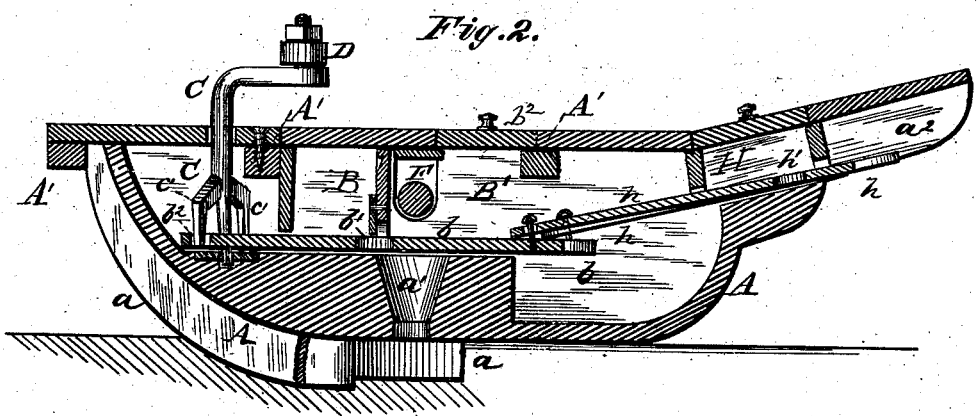
Witnesses:
P. C. Dietrich
Rod. F. Dietrich
Inventor.
Wade H. Haworth
by DeWitt C. Allen
attorney (No Model.) 2 Sheets—Sheet 2.
W. H. HAWORTH.
Corn-Planter.
No. 228,068. Patented May 25, 1880.
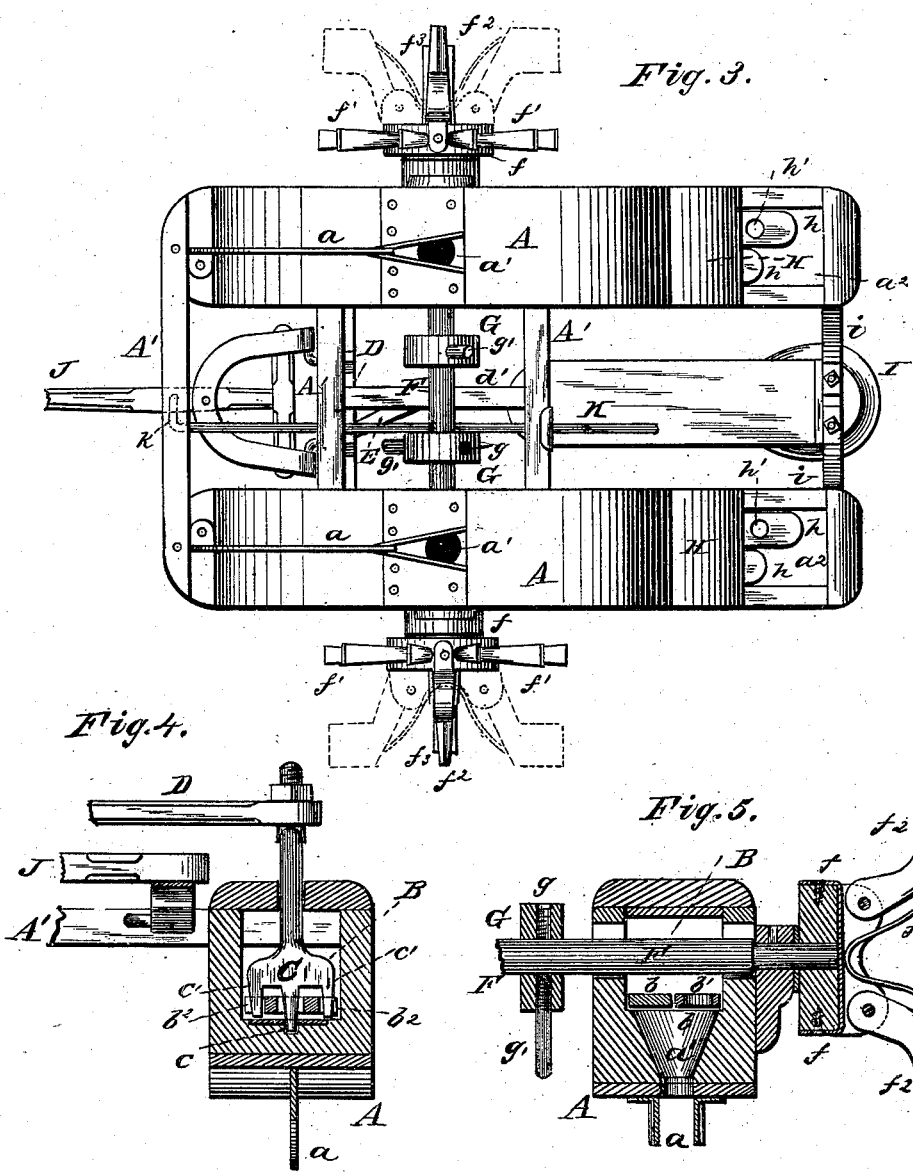
Witnesses:
P. C. Dieterich
Fred G. Dieterich
Inventor:
Wade H. Haworth
by DeWitt C. Allen
attorney

UNITED STATES PATENT OFFICE.

WADE H. HAWORTH, OF TOWANDA, ILLINOIS.

CORN-PLANTER.

SPECIFICATION forming part of Letters Patent No. 228,068, dated May 25, 1880.

Application filed March 6, 1880. (No model.)

*To all whom it may concern:*

Be it known that I, WADE H. HAWORTH, of Towanda, in the county of McLean, and in the State of Illinois, United States of America, have invented certain new and useful Improvements in Corn-Planters; and I do hereby declare that the following is a full, clear, and exact description thereof, reference being had to the accompanying drawings, and to the letters of reference marked thereon, making a part of this specification, and in which—

Figure 1 is a perspective view of my improved planter; Fig. 2, a longitudinal vertical section through one of the box-runners; Fig. 3, a bottom-plan view. Figs. 4 and 5 are detail sectional views.

My invention relates to certain new and useful improvements in corn-planters; and the invention consists in the novel construction, combination, and arrangement of the several parts forming my improved planter, all as will be hereinafter fully described, and specifically pointed out in the claims.

To enable others skilled in the art to make and use my invention, I will now proceed to describe its construction and operation.

In the drawings, A A represent a pair of box-runners, upon and in which are located the operating parts of my improved planter, said runners being provided on the under sides with steel cutters or furrow-openers $a$ $a$, terminating under discharge-tubes $a'$ $a'$, and connected together by cross-bars A' A'.

B B represent the seed-receptacles, formed or placed in the runners A A, and through and over the bottom of which work the parallel longitudinal seed-slides $b$ $b$, for conveying the seed to the discharge-openings communicating with the discharge-tubes $a'$ $a'$, each of said seed-slides being provided with a hole, $b'$, through it for containing the requisite amount of seed to be dropped at a time.

The seed-slides are located in the box-runners, and the slides for each seed-receptacle are simultaneously reciprocated or moved in opposite directions through the medium of the three-pronged cranks C C, the longest or center prong, $c$, being journaled in the runner, while the outer prongs, $c'$ $c'$, fit in holes $b^2$ $b^2$, near the forward ends of said seed-slides, so that as said cranks are vibrated they will impart to each pair of seed-slides reciprocating movements in opposite directions. These cranks are connected together at their upper ends by a cross-bar, D, having a hasp, $d$, on its under side, in which works the free end of a lever, E, having a rear vertical post, $e$, journaled in the beams $d'$ $d'$, and as said lever is vibrated it communicates a corresponding vibrating movement to the cross-bar and cranks for operating the seed-slides.

F represents a transverse shaft passing through and journaled in the runners A A, and having mounted on its ends fixed hubs $f$ $f$, having a series of radial spokes, $f'$, for engaging with the ground as the planter is moved over it, for revolving said shaft.

G G represent two disks mounted on the shaft F, having a series of holes, $g$, for the reception of one or more pins, $g'$, the pin or pins of one disk arranged so as to alternately strike the projecting arms $e'$ $e'$ of the lever E as the shaft F is revolved, thus communicating a vibrating movement thereto.

H H represent receptacles located in the runners in rear of the boxes or receptacles B B, for containing lime, ashes, or other suitable fertilizing material, having similar dropping-slides $h$ $h$, connected to and operated through the medium of the reciprocating seed-slides $b$ $b$, said slides having holes $h'$ $h'$, of sufficient size to collect and drop about a tablespoonful of the fertilizing material at a time directly onto the hill of corn last planted, said receptacles H being located at the proper distance from the receptacles B, corresponding to the distance between the hills of corn planted.

The runners A A are provided with openings $a^2$ $a^2$ near their rear ends, through which the fertilizing material is dropped.

The hubs $f$ $f$ are each provided with two pivoted marking-arms, $f^2$ $f^2$, which enter the soil as said hubs are turned by the spokes $f'$, for indicating just where the corn is dropped, said markers being located at a distance from the hill planted equal to one-half the distance between the hills or rows of corn planted. Therefore, when it is desired to turn the planter the marker is placed on the last spot marked on the side the corn is planted, (one marking-arm being directly above the other,) so that the marking-arms on one side of the planter will enter the holes last marked, while the marking-arms on the other side will mark the ground for the next row of corn to be planted.

$f^3 f^3$ represent springs for holding the arms in proper working position, but which admit of their yielding readily when striking against any obstructions in the ground.

I represents the driver's seat, supported above the runners and at their rear ends by inclined braces $i\ i$; and J represents the tongue or pole, pivoted to one of the cross-bars, A', near the front ends of the runners.

K represents a lever having a curved hook, $k$, adapted to engage with and hold the tongue or pole down when it is desired to turn the planter, said lever extending backward and operated by the foot of the driver or operator. The operator, sitting on the seat, located at the rear end of the runners, aids materially by his weight in elevating the front part of the runners or planter when it is desired to turn the planter, although the pole or tongue, being fastened down at the front end of planter, will raise it at that end, on account of the planter being set so low on the ground. When turned and in position, the said lever K is turned by the foot of the driver, which releases the tongue or pole from the fore part of planter, the driver at the same time moving forward on the seat, thus permitting of the planter resuming a proper condition to be drawn forward and operated.

The cutters under the runners make a small furrow, which, when the corn is dropped therein, is filled and covered with earth by the broad flat runners, which also press the dirt upon the grain in passing over it.

The runners are shod with steel or smooth iron, which, being nicely polished, enables the planter to be easily drawn over the ground.

In passing from field to field the planter is tilted up, as in turning, the tongue or pole being fastened to front of planter, as before described, while the driver aids the operation by sitting as far back as possible on the seat, although, the planter being so low, the tongue or pole will alone, when fastened down, elevate the front part of planter sufficiently so that the cutters and discharge-tubes will be off the ground.

Located between the seed-boxes and fertilizer-boxes are boxes B', covered by hinged doors $b^2$, which can be left open when the machine is in operation, in order to enable the driver to see if the seed and fertilizing slides are working properly.

Further explanation of the operation of the machine is deemed unnecessary, it being obvious from the foregoing description.

Having thus fully described my invention, what I claim as new, and desire to secure by Letters Patent, is—

1. In a corn-planter, the combination of a seed-receptacle having two parallel and longitudinal reciprocating seed-slides moving in opposite directions and a fertilizing-receptacle, arranged in rear of the seed-receptacle, having similar slides, connected to and operated through the movement of the seed-slides, substantially as herein shown and described.

2. In a corn-planter, the combination, with the parallel seed-slides $b\ b$, of the vertical three-pronged vibrating crank C $c\ c'\ c'$, for moving said slides in opposite directions, substantially as and for the purpose specified.

3. In a corn-planter, the combination, with the two pairs of seed-slides $b\ b$, of the vertical three-pronged cranks C C, connecting cross-bar D, pivoted armed lever E $e\ e'\ e'$, and revolving shaft F, provided with disks G G, having one or more pins, $g'$, the several parts constructed and arranged to operate substantially as and for the purpose herein shown and described.

4. In a corn-planter, the combination of two parallel box-runners connected together, and each having seed and fertilizing receptacles arranged therein, with dropping-slides, substantially as herein shown and described.

5. In a corn-planter, the combination of two parallel box-runners connected together, and having arranged therein the seed-receptacles B B, central boxes, B' B', fertilizing-receptacles H H, and dropping-slides $b\ h$, the several parts arranged relatively to each other substantially as herein shown and described.

6. In a corn-planter, the combination, with two box-runners, A A, suitably connected together, and upon and in which all the operating parts of the planter are mounted, of the driver's seat, supported upon and at the extreme end of the runners, the pole or tongue pivoted at or near the front end of the planter, and a locking-lever extending back and adapted to be operated by the foot of the driver for securing the tongue down upon the front part of the planter, substantially as and for the purpose herein shown and described.

In testimony that I claim the foregoing I have hereunto set my hand this 24th day of February, 1880.

WADE H. HAWORTH.

Witnesses:
 THOS. SLADE,
 H. E. HADLEY.